Patented Dec. 28, 1948

2,457,635

UNITED STATES PATENT OFFICE 2,457,635

METHOD OF REGENERATING AQUEOUS ALKALI SOLUTION USED TO EXTRACT WEAKLY ACIDIC SULFUR COMPOUNDS FROM HYDROCARBON FLUIDS

Donald C. Bond, Northbrook, and Michael Savoy, Chicago, Ill., assignors to The Pure Oil Company, Chicago, Ill., a corporation of Ohio No Drawing. Application October 10, 1945, Serial No. 621,590

17 Claims. (Cl. 196—30)

This invention relates to removal of acidic sulfur compounds from hydrocarbon fluids and more particularly to the removal of mercaptans from hydrocarbon liquids such as gasoline.

In Patent No. 2,369,771, there is disclosed a process for extracting weekly acidic sulfur compounds from hydrocarbon fluids by means of aqueous alkali solution under non-oxidizing conditions and regenerating the alkali solution after separation from the hydrocarbon fluid by air blowing in the presence of a small amount of certain phenolic substances as catalysts.

A number of hydroxy aromatic or phenolic compounds are ineffective as catalysts in the air regeneration of used alkali or are only slightly effective. Among those compounds which are ineffective are compounds having critical oxidation potentials above those of the mercaptans or other acidic sulfur compounds which it is desired to remove from the hydrocarbon fluid. Critical oxidation potentials of various compounds and substances are determined in accordance with the method of Fieser, set forth in the Journal of the American Chemical Society, No. 52, pages 5204 to 5241, for the year 1930. Some compounds which have critical oxidation potentials below those of the mercaptans or acidic sulfur compounds which it is desired to extract, are only slightly effective as oxidation catalysts. As examples may be mentioned catechol and rufigallol.

We have discovered that those phenolic compounds which are ineffective or only slightly effective as catalysts in the regeneration of aqueous alkali solutions used for extracting mercaptans or other weakly acidic sulfur compounds from hydrocarbon fluids, can be made effective if an extremely small quantity of a compound of a metal selected from the group consisting of copper, nickel, cobalt, and iron, and preferably the salts of said metal which are soluble in the alkali solution, is added to the aqueous alkali solution. Although all such salts are effective in enhancing the catalytic properties of the phenolic compound, copper chloride has been found to be superior to the other metal salts for this purpose.

In practicing the invention, the copper chloride or other metal compound is added to the aqueous alkali solution in minute quantities. In our experimental work we have found that 0.002 of 1% of copper chloride is just as effective as 0.02% of copper chloride. The metal compound may be used in amounts as low as .0001% and in amounts up to 1%, although there is no advantage in using more than a very slight amount and there is a disadvantage in that the gasoline or other liquid treated may become contaminated with the metal. When quantities of the order of .02% or less of the metal compound is used, no difficulty from contamination is experienced. An amount of the metal compound equal to 10% or less by weight of the phenolic compound is effective. The compound may be added to the aqueous solution before or after it is used to treat the hydrocarbon fluid and does not interfere with the ability of the aqueous alkali to extract mercaptans or other sulfur compounds from the hydrocarbon fluid. Solutions containing metal compounds as hereinabove set forth, can be repeatedly regenerated without the necessity of adding further quantity of the metal compound or phenol. From time to time it may be necessary to add additional quantities of salt and/or phenolic compound to maintain the regenerative capacity of the catalyst.

As examples of phenolic compounds which are useful in conjunction with metal compounds may be mentioned 4,4' dihydroxy diphenyl, catechol, chlorohydroquinone, rufigallol, guaiacol, resorcinol, alpha-naphthol, beta-naphthol and 2,7 dihydroxy naphthalene. In general phenols or phenolic compounds which are less effective than hydroquinone are beneficially effected by the presence of the metal compound. The phenolic compounds may be used in amounts ranging from 0.1% to approximately 3% by weight of the solution. Regeneration of the used solution may be effected by contacting the solution counter-currently with a stream of air in a contact tower or by bubbling air through the solution at temperatures ranging from approximately 60° to 130° F. Lower or higher temperatures are not excluded, although lower temperatures require longer periods of time for regeneration, while higher temperatures, although shortening the period of time for regeneration, may give rise to formation of undesirable oxidation products. Regeneration may be carried out under atmospheric, sub-atmospheric or super-atmospheric pressure.

The regeneration may be carried to the point where substantially the entire mercaptide or other acidic sulfur compound content of the aqueous solution is oxidized; or regeneration may be carried to an extent only sufficient to lower the mercaptide or other sulfur compound content to a point such that the alkali solution is effective for extracting further quantities of mercaptans or other weakly acidic sulfur compounds from hydrocarbon fluids. Care should be exercised not to leave residual oxygen in the alkali solution since the solution upon contact with the fluid to be treated will oxidize rather than extract the sulfur compounds.

In order to demonstrate the effectiveness of metal salts when used in conjunction with phenolic compounds having little or no ability to catalyze the oxidation of mercaptans and other acidic sulfur compounds, a series of tests was made in which 1% by weight of normal butyl mercaptan was dissolved in the aqueous alkali solution to be tested and each sample of solution was tested by placing 50 cc. thereof in a 100 cc. graduated cylinder containing 75 cc. of No. 4 glass beads. A dip tube was placed in the cylinder so that the bottom thereof extended to the bottom of the cylinder and air was passed through the tube and bubbled through the solution for one hour at the rate of 0.03 cu. ft. per hour at a temperature of 75° F. The results obtained in the various tests are tabulated in the following table. Each solution tested was an aqueous solution containing 10% by weight of sodium hydroxide. The other constituents of the solution are given in the table.

rate of normal butyl mercaptan when used in conjunction with chlorohydroquinone and catechol is also shown in the table. In each case the regeneration rate is considerably accelerated.

In contrast with the positive results obtained with 4,4′ dihydroxy diphenyl, chlorohydroquinone and catechol, negative results were obtained with hydroquinone. Hydroquinone is known to be an effective oxidation catalyst since it forms a quinone upon oxidation which is capable of giving up oxygen and reverting back to the hydroquinone form. The presence of copper or nickel chloride in the alkali solution detracted from the efficacy of the hydroquinone as an oxidation catalyst.

In carrying out our invention, the gasoline or other hydrocarbon fluid to be treated is contacted with the aqueous alkali solution, which preferably should contain at least 10% by weight of free caustic alkali, such as sodium or potassium hydroxide, under non-oxidizing conditions so that the mercaptans or other weakly acidic sulfur compounds are extracted from the hydrocarbon

*Table*

| Solution No. | Hydroxy Aromatic Compound Used | | Metal Salt Used | | Per cent n-butyl mercaptan oxidized |
|---|---|---|---|---|---|
| | Name | Wt. Per Cent | Name | Wt. Per Cent | |
| 1 | None | | None | | 0.9 |
| 2 | do | | CuCl₂ | 0.002 | 1.2 |
| 3 | do | | do | 0.02 | 1.1 |
| 4 | 4,4′ dihydroxy diphenyl¹ | 1.0 | None | | 0.9 |
| 5 | 4,4′ dihydroxy diphenyl cresol | 10.0 | do | | 1.5 |
| 6 | do | 10.0 | CuCl₂ | 0.02 | 7.5 |
| 7 | do | 10.0 | do | 0.002 | 7.5 |
| 8 | Chlorohydroquinone | 1.0 | None | | 2.3 |
| 9 | do | 1.0 | CuCl₂ | 0.002 | 8.6 |
| 10 | do | 1.0 | do | 0.02 | 8.6 |
| 11 | Catechol | 1.0 | None | | 4.7 |
| 12 | do | 1.0 | CuCl₂ | 0.002 | 10.1 |
| 13 | Hydroquinone | 1.0 | None | | 14.6 |
| 14 | do | 1.0 | CuCl₂ | 0.002 | 13.0 |
| 15 | do | 1.0 | NiCl₂ | 0.002 | 8.1 |
| 16 | Catechol | 1.0 | do | 0.002 | 7.2 |
| 17 | None | | do | 0.002 | 1.1 |
| 18 | do | | CoCl₂ | 0.002 | 2.2 |
| 19 | do | | FeCl₂ | 0.002 | 2.2 |
| 20 | Chlorohydroquinone | 1.0 | CoCl₂ | 0.002 | 4.5 |
| 21 | Catechol | 1.0 | do | 0.002 | 7.4 |
| 22 | do | 1.0 | FeCl₂ | 0.002 | 8.6 |

¹ Did not completely dissolve.

From an examination of the table it will be seen that the aqueous alkali solution containing no catalyst resulted in the oxidation of 0.9% of normal butyl mercaptan (solution 1). The addition of copper chloride to the solution caused only a very slight increase in the oxidation rate of the normal butyl mercaptan as shown by solutions 2 and 3. It is also evident from solutions 2 and 3 that increasing the copper chloride content did not accelerate the rate of regeneration.

Solution 4 shows that 4,4′ dihydroxy diphenyl, in the absence of copper chloride, does not increase the oxidation rate of normal butyl mercaptan. Since 4,4′ dihydroxy diphenyl is not completely soluble in the alkali solution, cresol was added to the solution in order to cause the 4,4′ dihydroxy diphenyl to go in solution. The cresol when present in the amount of 10% increased the oxidation rate only to a slight extent.

The effect of copper chloride on the regeneration rate is shown by solutions 6 and 7, wherein the percent of normal butyl mercaptan oxidized was 7.5%. In view of the fact that the rate of oxidation is only 1.5% without copper chloride, this increase in the oxidation rate is unusual.

The effect of copper chloride, nickel chloride and ferrous chloride in accelerating the oxidation fluid and removed therefrom. The separated aqueous alkali solution is contacted with the hydrocarbon fluid in an amount equal to about 5 to 20% by volume of the hydrocarbon fluid, although the ratio of alkali to fluid may be larger where the content of acidic sulfur compounds in the hydrocarbon fluid is large, or the nature of the sulfur compounds is such as to require more extended contact in order to extract them. The aqueous alkali solution containing the extracted compounds is separated from the hydrocarbon fluid and contacted with air or other suitable free oxygen-containing gas under the conditions as hereinbefore described to oxidize the sulfur compounds to disulfides or other compounds which can be readily separated from the aqueous alkali solution by decantation or by decantation plus washing of the alkali with naphtha or other light hydrocarbon liquid. The alkali solution can then be used for extraction of further quantities of sulfur compounds.

The invention is also useful in the oxidation in situ of malodorous sulfur compounds such as mercaptans to sulfur compounds which do not have an objectionable odor such as disulfides. In this type of process the hydrocarbon fluid is contacted with air in the presence of the aqueous alkali solution containing the oxidation catalysts in order to accelerate the rate of oxidation. The resulting sulfur compounds will remain in the hydrocarbon fluid.

The process whether carried out as a regeneration process or a sulfur oxidation process may be used either in batch or continuous operation and the alkali solution may be repeatedly used or recycled with addition of make-up chemicals as required.

We claim:

1. The method of oxidizing weakly acidic sulfur compounds occurring in petroleum hydrocarbons comprising, contacting said compounds with gas containing free oxygen in the presence of aqueous alkali solution containing from 0.1 to 3 per cent by weight of an added phenolic substance which is less effective than hydroquinone as an oxidation catalyst in the reaction and has an oxidation potential higher than that of the sulfur compounds, and from .0001 to 1 per cent by weight of a salt of a metal selected from the group consisting of copper, nickel, cobalt and iron, the metal salt used being soluble in the alkali solution and being present in an amount equal to a small fraction of the amount of phenolic compound present.

2. Method in accordance with claim 1 in which the metal compound is cupric chloride.

3. Method in accordance with claim 1 in which the metal compound is cobalt chloride.

4. Method in accordance with claim 1 in which the metal compound is nickel chloride.

5. The method of regenerating aqueous alkali solution used to extract weakly acidic sulfur compounds from hydrocarbon fluids under non-oxidizing conditions comprising contacting said solution with gas containing free oxygen in the presence of from 0.1 to 3 per cent by weight of an added phenolic substance which is less effective than hydroquinone as an oxidation catalyst in the reaction and has an oxidation potential higher than that of the sulfur compounds, and from .0001 to 1 per cent by weight of a salt of metal selected from the group consisting of copper, nickel, cobalt and iron, the metal salt being soluble in the alkali solution and being present in an amount equal to a small fraction of the amount of the phenolic substance.

6. Method in accordance with claim 5 in which the metal compound is cupric chloride.

7. Method in accordance with claim 5 in which the metal compound is nickel chloride.

8. The method of oxidizing acidic sulfur compounds in hydrocarbon fluids comprising simultaneously contacting said fluid with free oxygen-containing gas and aqueous alkali solution containing from 0.1 to 3 per cent by weight of an added phenolic substance which is less effective than hydroquinone as an oxidation catalyst in the reaction and has an oxidation potential higher than that of the sulfur compounds, and from .0001 to 1 per cent by weight of a salt of a metal selected from the group consisting of copper, nickel, cobalt and iron, the metal salt being soluble in the alkali solution and present in an amount equal to a small fraction of the phenolic substance.

9. Method in accordance with claim 8 in which the metal compound is cupric chloride.

10. Method in accordance with claim 8 in which the metal compound is nickel chloride.

11. Method in accordance with claim 8 in which the metal compound is cobalt chloride.

12. Method in accordance with claim 1 in which the metal compound is cupric chloride and the phenolic substance is 4,4' dihydroxy diphenyl.

13. Method in accordance with claim 1 in which the metal compound is cupric chloride and the phenolic substance is catechol.

14. Method in accordance with claim 1 in which the metal compound is cupric chloride and the phenolic substance is chlorohydroquinone.

15. Method in accordance with claim 5 in which the metal compound is cupric chloride and the phenolic substance is 4,4' dihydroxy diphenyl.

16. Method in accordance with claim 5 in which the metal compound is cupric chloride and the phenolic substance is catechol.

17. Method in accordance with claim 5 in which the metal compound is cupric chloride and the phenolic substance is chlorohydroquinone.

DONALD C. BOND.
MICHAEL SAVOY.

REFERENCES CITED

The following references are of record in the file of this patent:

UNITED STATES PATENTS

| Number | Name | Date |
|---|---|---|
| 1,827,912 | Rosenstein | Oct. 20, 1931 |
| 1,943,744 | Rosenstein | Jan. 16, 1934 |
| 1,964,220 | Schulze et al. | June 26, 1934 |
| 2,015,038 | Pevere | Sept. 17, 1935 |
| 2,148,470 | Hughes | Feb. 28, 1939 |
| 2,315,530 | Loyd | Apr. 6, 1943 |
| 2,369,771 | Bond | Feb. 20, 1945 |